May 1, 1956 E. H. SEIBERT 2,743,610
HYGROMETER
Filed Sept. 1, 1950
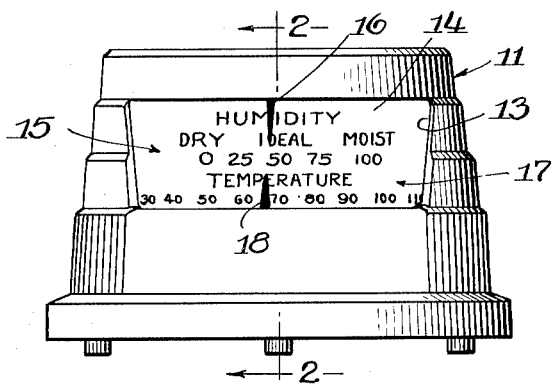
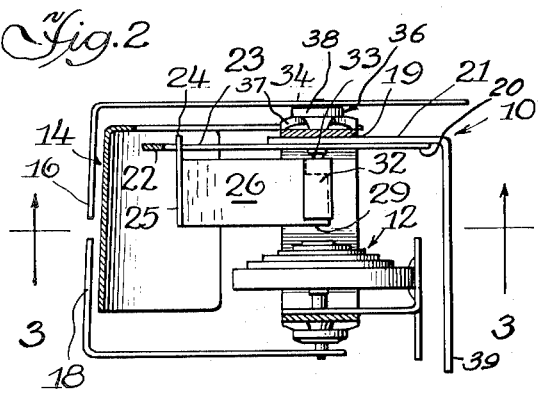
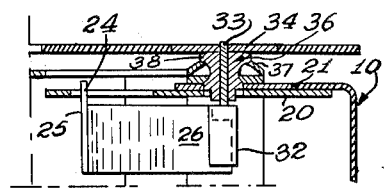
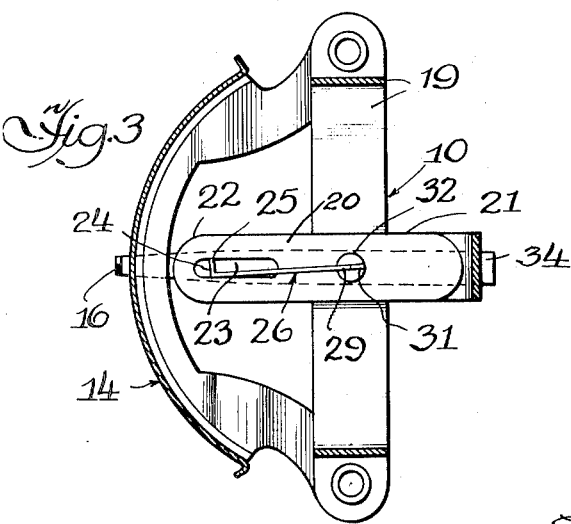
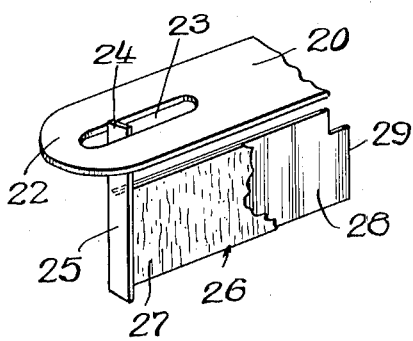
Inventor,
Ernest H. Seibert
By: Wilson & Geppert Attys.

United States Patent Office 2,743,610
Patented May 1, 1956

2,743,610

HYGROMETER

Ernest H. Seibert, Chicago, Ill., assignor, by mesne assignments, to Cory Corporation, a corporation of Delaware Application September 1, 1950, Serial No. 182,677

3 Claims. (Cl. 73—337)

The present invention relates to humidity gauges or hygrometric devices for indicating the relative humidity or degree of moisture in a room or other enclosure where the temperature is maintained substantially constant, and especially to a novel hygroscopic element and unit for such gauges or hygrometers.

Considerable difficulty has been experienced in an endeavor to form or construct a hygroscopic coil or member that will relatively quickly and accurately determine and record or indicate the relative humidity or degree of moisture in the atmosphere in a confined space such as a room or other enclosure where the temperature is maintained substantially constant, and much time and effort has been exerted toward attainment of this object of fabricating a hygroscopic coil or unit that is quickly responsive to humidity changes, is accurate and maintains its accuracy over a relatively long period of time.

Instruments employing a coil formed of a strip of hygroscopic material attached to a strip or backing of thin metal or the like have been used for indicating the relative humidity by means of changes in the physical dimensions. However, in such prior devices variations in the longitudinal dimensions of the hygroscopic material forming the control element of the unit is not accurately transmitted to the metal backing and from the latter to the indicating means.

It is an important object of the present invention to obviate the above and other inherent objections of the prior devices by the provision of the present novel hygroscopic unit comprising a laminated element composed of a thin strip of a porous, moisture-absorbent material forming the control element and a backing formed of a thin strip impervious to moisture, and joining these members into a permanent unit that accurately determines the relative humidity of the surrounding atmosphere in a room or other enclosure where the temperature is maintained substantially constant, by concaving or convexing from a predetermined normal position according to the percentage of moisture absorbed by the porous material from the atmosphere.

The present invention further comprehends the provision of a novel hygroscopic device for indicating or recording the relative humidity in the surrounding atmosphere in a room or other enclosure where the temperature is maintained substantially constant, and including a laminated unit composed of a flat strip of porous material adapted to absorb the moisture from the surrounding atmosphere and a coextensive thin metal strip laminated and permanently affixed thereto, the unit being so mounted that upon any variation in the percentage in the humidity of the surrounding atmosphere from a predetermined normal reading in which the unit is disposed in a straight line, the unit is curved from its straight line position in accordance with the moisture absorbed.

In the preferred and illustrated embodiment, the unit or hygroscopic element is disposed in a substantially straight line position when the relative humidity is approximately 50%, and when the humidity is greater than the normal amount whereupon the absorbent material is expanded, this expansion causes the element to assume a convex curvature. Conversely, when the humidity is less than 50%, the absorbent material contracts and the element is made to assume a concave curvature, the degree of convexity or concavity depending upon the degree of humidity absorbed by the absorbent material from the surrounding atmosphere above or below the normal amount.

A further object of the present invention is the provision of a novel means and manner of mounting and arranging the novel hygroscopic element whereby the contraction and expansion of the moisture absorbent material of said element is quickly, positively and accurately transmitted to an indicating or recording means and translated into an accurate reading of the relative humidity of the surrounding atmosphere in a room or other enclosure where the temperature is maintained substantially constant.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in front elevation of a humidity and temperature indicating device embodying the present invention of my novel hygroscopic unit and assembly.

Fig. 2 is a view in vertical cross section through the humidity and temperature indicating mechanism of the device removed from the housing or casing, the view being taken in a plane represented by the line 2—2 of Fig. 1.

Fig. 3 is a view in horizontal cross section taken in a plane represented by the line 3—3 of Fig. 2 and viewed in the direction of the arrows, the view showing the humidity indicating element, its assembly and mounting.

Fig. 4 is a fragmentary enlarged view in perspective of the novel hygroscopic element and showing the manner of loosely mounting the free end of this hygroscopic element in the forward end of the slotted adjusting lever.

Fig. 5 is a fragmentary top plan view of the free end of an alternate construction of the hygroscopic element in which the free end is formed into substantially V-shape to provide a three point contact of the projection at the free end in the slotted adjusting lever and to strengthen the projecting end.

Fig. 6 is a fragmentary view in vertical cross section of the pivotal mounting and associated parts in Fig. 2.

Referring more particularly to the disclosure in the drawing and to the novel embodiment selected to illustrate the present invention, the novel hygroscopic unit or assembly designated generally by the reference numeral 10, is preferably enclosed within a suitable housing or casing 11 in which may also be enclosed a temperature indicating means 12. The housing or casing 11 is provided with an opening 13 preferably enclosed or protected by a suitable transparency behind which is disposed a stationary scale 14 divided horizontally into upper designations 15 showing the relative humidity in the room or enclosure determined by a pointer or indicator 16, and lower designations 17 for visually indicating or showing the temperature in the room or enclosure in which the instrument is placed by means of a pointer or indicator 18.

The present invention relates to the means and mechanism for indicating the relative humidity on the upper designations 15 of the scale 14 and comprises a stationary bracket or support 19 upon which is rotatably mounted an adjusting lever 21 having an arm 20 rigidly affixed thereto and provided adjacent its outer or forward end 22 with a longitudinally extending elongated slot 23. At its inner end or rear this lever is provided with a depending leg or projection, movement of which permits adjustment of and location of the forward end 22 and the position of its slot 23. This slot is adapted to receive the lateral projection or extension 24 on the free end 25 of a laminated hygroscopic element 26 composed of a strip of absorbent material 27 affixed to a thin strip of metal 28 by a water insoluble rubber adhesive which permanently retains its flexibility so that these strips remain joined together. The other end 29 of the hygroscopic element 26 is adapted to be received and anchored in a longitudinally extending slot or groove 31 in a slotted post 32. This slotted post is secured to one end of a pivot pin or shaft 33 journalled in a bearing or bushing 36 mounted in the bracket or support 19 and to the other end of this pivot pin or shaft is secured the carrying arm 34 of the indicator pointer 16. A spring washer 37 is disposed between the enlarged upper end 38 of the bushing or bearing 36 and the stationary bracket or fixed support 19, with the bushing or bearing projecting through an opening in the bracket or support 19 and flared outwardly thereunder and intermediate its length to anchor it in an opening in the arm 20, the lower end of the bearing or bushing 36 projecting through an opening in the lever 21.

The lateral projection or extension 24 of the free end 25 of the hygroscopic element 26 is offset as shown in Figs. 2, 3 and 4, or it may be formed in substantially V-shape as shown at 35 in Fig. 5, and longitudinally movable or adjustable in the elongated slot 23 of the adjusting lever as it is responsive to humidity changes.

In forming the laminated element 26, I preferably employ as the hygroscopic or moisture absorbent material 27 a ledger paper of substantially 100% rag stock devoid of sulfite and with the grain of the paper running across or transverse of the narrow width of the strip. This absorbent material is affixed to one side of a very thin strip 28 of relatively dead soft metal such as a soft shim brass with the grain of the metal also running across or transverse of the narrow width of the strip. Excellent results have been secured by employing a strip 27 consisting of a single sheet of an absorbent paper or material of approximately .007 inch thickness, and a strip of metal 28 of brass of a thickness of the order of .001 inch. However, these are to be taken as illustrative only and not as limiting the invention to the particular dimensions employed.

Before uniting these laminae together into sheet form and then into a permanent unit assembly, the brass is thoroughly cleaned in order to assure complete and permanent adhesion of the cement or adhesive. Such metal should be smooth without wrinkles or kinks and a water insoluble rubber cement or adhesive is then applied to one face thereof in such manner as to assure a thin and uniform coat over this entire surface. The cement or adhesive thus applied is permitted sufficient time to get tacky before the paper or absorbent material is applied. Care is taken that the paper is smoothly applied and that no air bubbles or unevenness is present between the paper and the metal backing. Then by the application of substantial pressure and allowing sufficient time for the cement to be thoroughly dried, the absorbent paper and the metal backing are permanently united. The hygroscopic laminated sheet so formed is then die cut to form elements 26 of the specific size and shape desired. In the illustrative embodiment shown in the drawing, the previously formed laminated sheet is die cut into the irregularly shaped elements 26 having an overall length of approximately .931 inch and a width through the body of approximately .343 inch.

Before assembling the laminated hygroscopic element 26 into the transmitting and translating mechanism, it is normalized to an indoor humidity of 50% in which condition the body of the element is flat and disposed in a straight line or plane but with the lateral projection 24 and the end 25 disposed at a desired angle with respect to the body as in Figs. 2, 3 and 4, or where this projection is of substantially V-shape as at 35 in Fig. 5, the apex of the V extends at an angle of approximately 90° with respect to the body. In this normal position, the slot 31 in the pointer post 32 is in line lengthwise with the pointer 16 connected thereto and the slot 23 in the adjusting lever 21.

When thus assembled and the relative humidity or moisture content in the surrounding atmosphere in a room or other enclosure where the temperature is maintained substantially constant is greater than 50% or normal, the porous hygroscopic material or paper 27 laminated to the thin metal backing 28 is expanded and due to its lamination to the brass backing the element 26 is curved convexly and moves the indicator pointer 16 to a higher moisture indication on the dial 14. Conversely, when the humidity in the surrounding air of the room or other enclosure is below 50% or normal, the drying of the paper or absorbent material 27 causes it to shrink and the element 26 to curve concavely whereby the indicator 16 is moved toward the left of the normal or ideal reading on the dial 14 to accurately indicate the then humidity.

The angular projection 24 on the free end 25 of the hygroscopic element 26 permits a free and frictionless movement in the slot 23 in the forward end 22 of the adjusting lever 21, transmitting this slight angular bend of the element 26 to the slotted post 32 and it in turn to the indicator or pointer 16, without any binding or loss of this movement, regardless of how slight that movement may be.

Although when properly assembled and adjusted ready for use the elongated slot 23 in the arm 20 of the adjusting lever 21 is in and normally remains in alignment with the arm 34 carrying the pointer, it sometimes happens that in shipping or when the unit is subjected to excessive jarring or abuse, the arm 20 and its adjusting lever 21 fixed thereto are rotated and displaced from their original or intended operative position. When this occurs, displacement of the forward end 22 of the arm 20 and its slot 23 displaces or moves therewith the lateral projection or extension 24 on the free end 25 of the hygroscopic element 26. The other end of the element 26 being connected or affixed to the post 32, any displacement of the lateral projection or extension 24 causes this post and its pivot pin or shaft 33 to be rotated and they in turn rotate the arm 34 carrying the pointer 16, whereby the pointer no longer accurately designates the relative humidity in a room or enclosure.

To adjust the unit to accurately designate the relative humidity in the room or enclosure in which it is placed, the operator merely moves the depending end 39 of the lever 21 to thereby rotate this lever and its arm 20 which in turn moves the connected lateral projection or extension 24 and the element 26, until the element rotates the post 32, its pivot pin or shaft 33 and the connected arm 34 and its pointer 16 back to their intended operative position in which the pointer accurately designates the relative humidity of the enclosure when checked or compared with another available control unit or gauge which accurately indicates the relative humidity. This adjustment will then be accurately maintained under normal operating conditions.

Although such adjustment is seldom necessary, provision has been made to assure proper and quick adjustment if and when the contingency arises, by merely moving the accessible depending end 39 of the lever 21 in one or the other direction of rotation depending upon which way the arm 20 must be moved to be again located in its properly adjusted position.

From the above description and the disclosure in the drawing, it will be evident that the present invention comprehends the provision of a novel hygroscopic element and unit assembly that is extremely accurate and quickly responsive to humidity changes, and one that may be quickly and economically manufactured and assembled.

Having thus disclosed the invention, I claim:

1. In a humidity indicator, a hygroscopic element consisting of two thin, rectilinear strips one of which is a thin flat strip of moisture absorbent material and the other a thin flat coextensive strip of metal adhesively united into an integral unit disposed in a straight line position when the humidity is normal, a scale for designating the humidity in the surrounding atmosphere of a room or other enclosure, an indicating pointer associated with the scale for visually indicating on the scale the humidity present, a lever arm extending longitudinally of said element and pivotally mounted for horizontal movement and provided adjacent one end with an elongated slot, a rotatably mounted slotted post attached to the indicating pointer, one end of said element being secured to the slotted post and indicating pointer and the other end having a projecting part freely supported and longitudinally movable in the elongated slot whereby said element is free to curve convexly or concavely from its normal straight line position upon the absorption of a greater or lesser quantity of moisture than normal, with such curvature being transmitted to the post and by it to the indicating pointer, said arm being adjusted to set said element to a desired initial position.

2. In a humidity indicating device, a hygroscopic member composed of two thin strips one of which is a thin control layer of a moisture absorbent material and the other a thin backing of soft metal adhesively joined to provide a laminated member disposed in a straight line when the humidity is normal and adapted to curve convexly when the absorbent material contains an amount of moisture greater than normal and to curve concavely when the amount of moisture in the absorbent material is less than normal, a scale containing degrees of humidity above and below normal, a pointer movable over said scale for indicating the humidity in the surrounding atmosphere of a room or other enclosure, an adjusting lever having an elongated slot for receiving a free end of said member and permitting limited movement thereof, said lever extending longitudinally of said member and pivotally mounted for horizontal movement, and means for securing the other end of said hygroscopic member to the pointer whereby said member is free to move from its normal straight line position to either a convex or concave position upon the absorption of a greater or lesser quantity of moisture and when so moved the end secured to the pointer moves the latter to indicate the degree of humidity present in the surrounding atmosphere, said lever being adjusted to set said member to a desired initial position.

3. In a humidity indicator, a hygroscopic element comprising a thin, flat strip of moisture absorbent material and a thin flat coextensive strip of metal adhesively united into an integral unit disposed in a straight line position when the humidity is normal, a scale for designating the humidity in the surrounding atmosphere of a room or other enclosure, an indicating pointer associated with the scale for visually indicating on the scale the humidity present, an arm extending longitudinally of said element and pivotally mounted for horizontal movement and provided adjacent one end with an elongated slot, a rotatably mounted member attached to the indicating pointer, one end of said element being attached to said member and indicating pointer with the other end having a projecting part freely supported and longitudinally movable in the elongated slot whereby said element is free to curve convexly or concavely from its normal straight line position upon the absorption of a greater or lesser quantity of moisture than normal, with such curvature being transmitted to the post and by it to the indicating pointer, said arm being adjusted to set said element to a desired initial position.

References Cited in the file of this patent

UNITED STATES PATENTS

| 1,966,931 | Mills | July 17, 1934 |
| 1,993,441 | Goss | Mar. 5, 1935 |
| 2,000,528 | Linderman | May 7, 1935 |
| 2,027,689 | Henning | Jan. 14, 1936 |
| 2,093,767 | Rollefson | Sept. 21, 1937 |
| 2,509,593 | Goddard | May 30, 1950 |
| 2,598,727 | Steinmetz | June 3, 1952 |

FOREIGN PATENTS

| 727,512 | France | Mar. 29, 1932 |